United States Patent
Minja

(10) Patent No.: US 11,816,015 B2
(45) Date of Patent: *Nov. 14, 2023

(54) MANAGEMENT OF EVENT LOG INFORMATION OF A MEMORY SUB-SYSTEM

(71) Applicant: Micron Technology, Inc., Boise, ID (US)

(72) Inventor: Erick W. Minja, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/403,379

(22) Filed: Aug. 16, 2021

(65) Prior Publication Data

US 2021/0374035 A1  Dec. 2, 2021

Related U.S. Application Data

(63) Continuation of application No. 16/223,897, filed on Dec. 18, 2018, now Pat. No. 11,093,364.

(51) Int. Cl.
*G06F 15/16* (2006.01)
*G06F 11/34* (2006.01)
(Continued)

(52) U.S. Cl.
CPC ........ *G06F 11/3476* (2013.01); *G06F 11/073* (2013.01); *G06F 11/3072* (2013.01);
(Continued)

(58) Field of Classification Search
CPC .............. G06F 11/3476; G06F 11/073; G06F 11/3072; G06F 16/345; G06F 2201/81; G06F 2201/86; G06F 2201/835; G06F 11/3034; G06F 11/3037; G06F 11/3058; G06F 17/40

See application file for complete search history.

(56) References Cited

U.S. PATENT DOCUMENTS 8,838,559 B1  9/2014 ORiordan
8,918,371 B1 * 12/2014 Prikhodko .......... G06F 11/3476
                                                      706/14

(Continued)

FOREIGN PATENT DOCUMENTS

WO   2017131774 A1   8/2017

OTHER PUBLICATIONS

PCT Notification of Transmittal of the International Search Report and the Written Opinion of the International Searching Authority for PCT Application No. PCT/US2019/066945, dated Apr. 23, 2020, 11 pages.

*Primary Examiner* — Kevin L Young
*Assistant Examiner* — Abdou K Seye
(74) *Attorney, Agent, or Firm* — Lowenstein Sandler LLP

(57) ABSTRACT

A set of log entries associated with a memory sub-system is caused to be stored in a first log subject to a wrapping process. A summarized log entry representing data of a portion of the set of log entries matching a pattern is generated and caused to be stored in a second log not subject to the wrapping process, where the summarized log entry is preserved from deletion via the wrapping process of the first log. The set of log entries is deleted from the first log by executing the wrapping process.

19 Claims, 8 Drawing Sheets

(51) Int. Cl.
  *G06F 11/30* (2006.01)
  *G06F 16/34* (2019.01)
  *G06F 11/07* (2006.01)

(52) U.S. Cl.
  CPC ........ *G06F 16/345* (2019.01); *G06F 2201/81* (2013.01); *G06F 2201/86* (2013.01)

(56) References Cited

U.S. PATENT DOCUMENTS

| | | |
|---|---|---|
| 2007/0074130 A1 | 3/2007 | Folting et al. |
| 2007/0118310 A1 | 5/2007 | Kindseth et al. |
| 2013/0124960 A1 | 5/2013 | Leong |
| 2013/0138667 A1 | 5/2013 | DeStefano et al. |
| 2014/0351655 A1* | 11/2014 | Malinowski ........ G06F 11/0778 714/45 |
| 2015/0242431 A1* | 8/2015 | Vlcek .................... G06Q 50/01 707/753 |
| 2016/0011960 A1 | 1/2016 | Krishna et al. |
| 2016/0070736 A1* | 3/2016 | Swan ................ G06F 16/24578 707/746 |
| 2016/0217162 A1 | 7/2016 | Ward |
| 2016/0275101 A1 | 9/2016 | Hinterbichler et al. |
| 2017/0078169 A1 | 3/2017 | Bent et al. |
| 2017/0220663 A1 | 8/2017 | Zhao et al. |
| 2019/0236160 A1* | 8/2019 | Wang .................... G06F 16/358 |
| 2020/0097172 A1* | 3/2020 | Diaconu ................ G06F 3/0673 |

* cited by examiner

FIG. 5A

| EventID | Event# | FWVer | PWRCycle | Temp | Dlen | Tstamp (10ms) | Hr:Min:Sec:msec | PECycles | Description |
|---|---|---|---|---|---|---|---|---|---|
| Event ID 1 | Event # 1 | FWVer value 1 | PWRCycle value 1 | Temp value 1 | Dlen value 1 | Tstamp value 1 | Hr:Min:Sec:msec value 1 | PECycles value 1 | Description 1 |
| Event ID 2 | Event # 2 | FWVer value 1 | PWRCycle value 1 | Temp value 2 | Dlen value 2 | Tstamp value 2 | Hr:Min:Sec:msec value 2 | PECycles value 2 | Description 2 |
| Event ID 2 | Event # 3 | FWVer value 1 | PWRCycle value 1 | Temp value 2 | Dlen value 2 | Tstamp value 3 | Hr:Min:Sec:msec value 3 | PECycles value 2 | Description 2 |
| Event ID 2 | Event # 4 | FWVer value 1 | PWRCycle value 1 | Temp value 2 | Dlen value 2 | Tstamp value 4 | Hr:Min:Sec:msec value 4 | PECycles value 2 | Description 2 |
| Event ID 2 | Event # 5 | FWVer value 1 | PWRCycle value 1 | Temp value 2 | Dlen value 2 | Tstamp value 5 | Hr:Min:Sec:msec value 5 | PECycles value 2 | Description 2 |
| Event ID 3 | Event # 6 | FWVer value 1 | PWRCycle value 1 | Temp value 2 | Dlen value 1 | Tstamp value 6 | Hr:Min:Sec:msec value 6 | PECycles value 2 | Description 3 |
| Event ID 1 | Event # 7 | FWVer value 1 | PWRCycle value 1 | Temp value 2 | Dlen value 1 | Tstamp value 7 | Hr:Min:Sec:msec value 7 | PECycles value 2 | Description 1 |
| Event ID 2 | Event # 8 | FWVer value 1 | PWRCycle value 1 | Temp value 3 | Dlen value 2 | Tstamp value 8 | Hr:Min:Sec:msec value 8 | PECycles value 2 | Description 2 |
| Event ID 2 | Event # 9 | FWVer value 1 | PWRCycle value 1 | Temp value 3 | Dlen value 2 | Tstamp value 9 | Hr:Min:Sec:msec value 9 | PECycles value 2 | Description 2 |
| Event ID 2 | Event # 10 | FWVer value 1 | PWRCycle value 1 | Temp value 3 | Dlen value 2 | Tstamp value 10 | Hr:Min:Sec:msec value 10 | PECycles value 2 | Description 2 |
| Event ID 2 | Event # 11 | FWVer value 1 | PWRCycle value 1 | Temp value 3 | Dlen value 2 | Tstamp value 11 | Hr:Min:Sec:msec value 11 | PECycles value 2 | Description 2 |
| Event ID 3 | Event # 12 | FWVer value 1 | PWRCycle value 1 | Temp value 3 | Dlen value 1 | Tstamp value 12 | Hr:Min:Sec:msec value 12 | PECycles value 2 | Description 3 |
| Event ID 1 | Event # 13 | FWVer value 1 | PWRCycle value 1 | Temp value 3 | Dlen value 1 | Tstamp value 13 | Hr:Min:Sec:msec value 13 | PECycles value 2 | Description 1 |
| Event ID 2 | Event # 14 | FWVer value 1 | PWRCycle value 1 | Temp value 3 | Dlen value 2 | Tstamp value 14 | Hr:Min:Sec:msec value 14 | PECycles value 2 | Description 2 |
| Event ID 2 | Event # 15 | FWVer value 1 | PWRCycle value 1 | Temp value 3 | Dlen value 2 | Tstamp value 15 | Hr:Min:Sec:msec value 15 | PECycles value 2 | Description 2 |
| Event ID 2 | Event # 16 | FWVer value 1 | PWRCycle value 1 | Temp value 3 | Dlen value 2 | Tstamp value 16 | Hr:Min:Sec:msec value 16 | PECycles value 2 | Description 2 |
| Event ID 2 | Event # 17 | FWVer value 1 | PWRCycle value 1 | Temp value 3 | Dlen value 2 | Tstamp value 17 | Hr:Min:Sec:msec value 17 | PECycles value 2 | Description 2 |
| Event ID 3 | Event # 18 | FWVer value 1 | PWRCycle value 1 | Temp value 3 | Dlen value 1 | Tstamp value 18 | Hr:Min:Sec:msec value 18 | PECycles value 2 | Description 3 |
| Event ID 1 | Event # 19 | FWVer value 1 | PWRCycle value 1 | Temp value 3 | Dlen value 1 | Tstamp value 19 | Hr:Min:Sec:msec value 19 | PECycles value 2 | Description 1 |
| Event ID 2 | Event # 20 | FWVer value 1 | PWRCycle value 1 | Temp value 3 | Dlen value 2 | Tstamp value 20 | Hr:Min:Sec:msec value 20 | PECycles value 2 | Description 2 |
| Event ID 2 | Event # 21 | FWVer value 1 | PWRCycle value 1 | Temp value 3 | Dlen value 2 | Tstamp value 21 | Hr:Min:Sec:msec value 21 | PECycles value 2 | Description 2 |
| Event ID 2 | Event # 22 | FWVer value 1 | PWRCycle value 1 | Temp value 3 | Dlen value 2 | Tstamp value 22 | Hr:Min:Sec:msec value 22 | PECycles value 2 | Description 2 |
| Event ID 2 | Event # 23 | FWVer value 1 | PWRCycle value 1 | Temp value 3 | Dlen value 2 | Tstamp value 23 | Hr:Min:Sec:msec value 23 | PECycles value 3 | Description 2 |
| Event ID 3 | Event # 24 | FWVer value 1 | PWRCycle value 1 | Temp value 3 | Dlen value 1 | Tstamp value 24 | Hr:Min:Sec:msec value 24 | PECycles value 3 | Description 3 |
| Event ID 1 | Event # 25 | FWVer value 1 | PWRCycle value 1 | Temp value 1 | Dlen value 1 | Tstamp value 25 | Hr:Min:Sec:msec value 25 | PECycles value 3 | Description 1 |
| Event ID 2 | Event # 26 | FWVer value 1 | PWRCycle value 1 | Temp value 1 | Dlen value 2 | Tstamp value 26 | Hr:Min:Sec:msec value 26 | PECycles value 3 | Description 2 |
| Event ID 2 | Event # 27 | FWVer value 1 | PWRCycle value 1 | Temp value 1 | Dlen value 2 | Tstamp value 27 | Hr:Min:Sec:msec value 27 | PECycles value 3 | Description 2 |
| Event ID 2 | Event # 28 | FWVer value 1 | PWRCycle value 1 | Temp value 1 | Dlen value 2 | Tstamp value 28 | Hr:Min:Sec:msec value 28 | PECycles value 3 | Description 2 |
| Event ID 2 | Event # 29 | FWVer value 1 | PWRCycle value 1 | Temp value 1 | Dlen value 2 | Tstamp value 29 | Hr:Min:Sec:msec value 29 | PECycles value 3 | Description 2 |
| Event ID 3 | Event # 30 | FWVer value 1 | PWRCycle value 1 | Temp value 1 | Dlen value 1 | Tstamp value 30 | Hr:Min:Sec:msec value 30 | PECycles value 3 | Description 3 |
| Event ID 1 | Event # 31 | FWVer value 1 | PWRCycle value 1 | Temp value 1 | Dlen value 1 | Tstamp value 31 | Hr:Min:Sec:msec value 31 | PECycles value 3 | Description 1 |
| Event ID 2 | Event # 32 | FWVer value 1 | PWRCycle value 1 | Temp value 4 | Dlen value 2 | Tstamp value 32 | Hr:Min:Sec:msec value 32 | PECycles value 3 | Description 2 |
| Event ID 2 | Event # 33 | FWVer value 1 | PWRCycle value 1 | Temp value 4 | Dlen value 2 | Tstamp value 33 | Hr:Min:Sec:msec value 33 | PECycles value 3 | Description 2 |
| Event ID 2 | Event # 34 | FWVer value 1 | PWRCycle value 1 | Temp value 4 | Dlen value 2 | Tstamp value 34 | Hr:Min:Sec:msec value 34 | PECycles value 3 | Description 2 |
| Event ID 2 | Event # 35 | FWVer value 1 | PWRCycle value 1 | Temp value 4 | Dlen value 2 | Tstamp value 35 | Hr:Min:Sec:msec value 35 | PECycles value 3 | Description 2 |
| Event ID 3 | Event # 36 | FWVer value 1 | PWRCycle value 1 | Temp value 4 | Dlen value 1 | Tstamp value 36 | Hr:Min:Sec:msec value 36 | PECycles value 3 | Description 3 |

| EventID | Event# range | PWer | PWer changes | PWRCycle | Temp | Temp +/- | Dien | Tstamp (time) range | PECycles | Description |
|---|---|---|---|---|---|---|---|---|---|---|
| Event ID 1 | Event #1 | 0x3 | PWer value 1 | 0 | PWRCycle value 1 | Temp value Y | 3 | Dien value 1 | 2 | PECycles value 2 | Pattern group type 2b |

| EventID | Event# range | PWer | PWer changes | PWRCycle | Temp | Temp +/- | Dien | Tstamp (time) range | PECycles | Description |
|---|---|---|---|---|---|---|---|---|---|---|
| Event ID 2 | Event #1 | 0x6 | PWer value 1 | 0 | PWRCycle value 1 | Temp value P | 5 | Dien value 1 | 1 | PECycles value 1 | Pattern group type 2c |

MANAGEMENT OF EVENT LOG INFORMATION OF A MEMORY SUB-SYSTEM

CROSS-REFERENCE TO RELATED APPLICATION

This application is a continuation of U.S. patent application Ser. No. 16/223,897, filed on Dec. 18, 2018, the entirety of which is hereby incorporated by reference herein.

TECHNICAL FIELD

The present disclosure generally relates to a memory sub-system, and more specifically, relates to management of event log information associated with a memory sub-system.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

FIGS. 5A, 5B, and 5C illustrate an example group-entry pattern of event log entries and corresponding summarized log entry generated in accordance with some embodiments of the present disclosure.

FIGS. 6A and 6B illustrate an example single-entry pattern of event log entries and a corresponding summarized log entry generated in accordance with some embodiments of the present disclosure.

DETAILED DESCRIPTION

Figure 1:
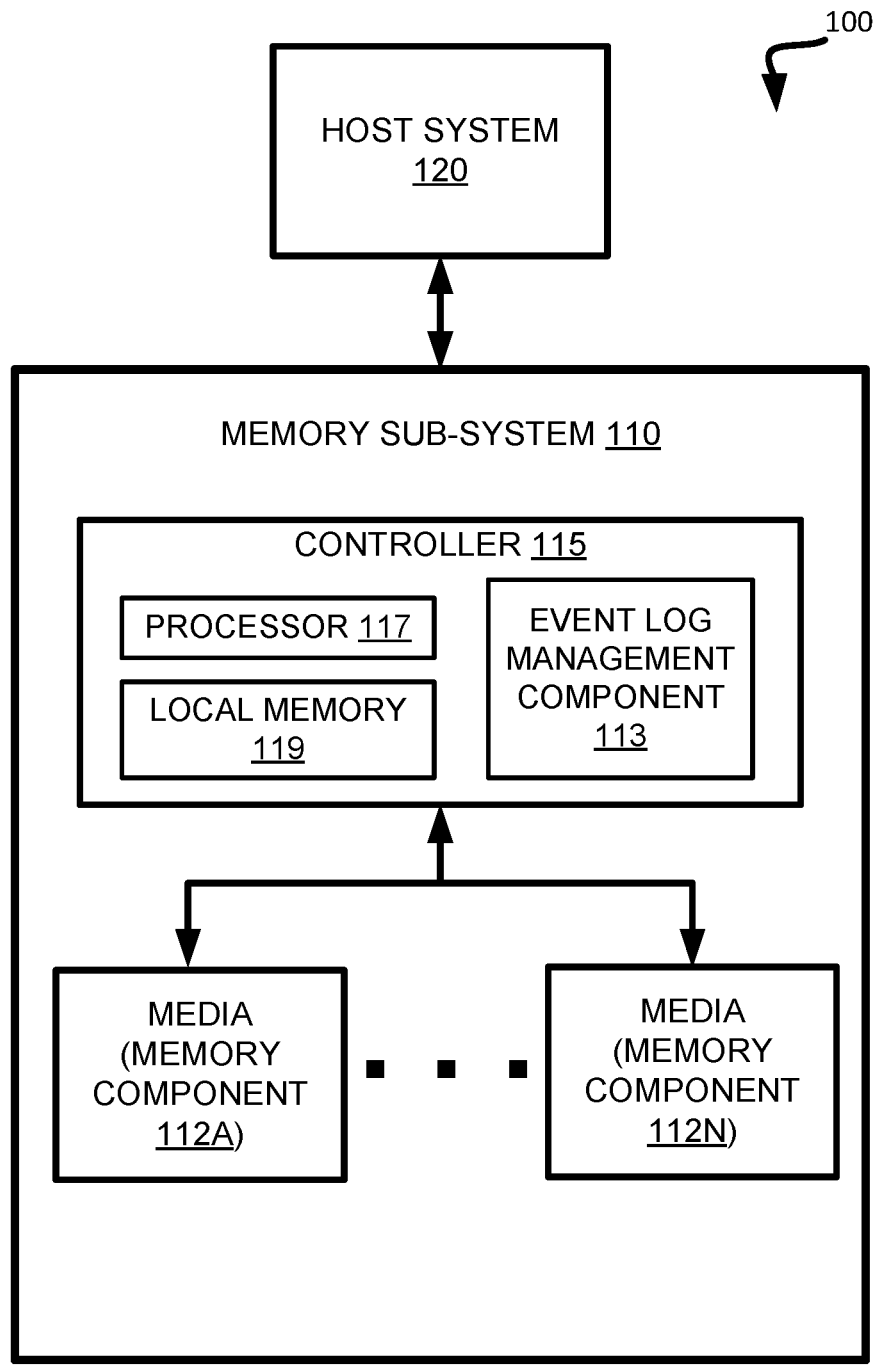
FIG. 1 illustrates an example computing environment that includes a memory sub-system in accordance with some embodiments of the present disclosure.

Aspects of the present disclosure are directed to management of event log information associated with a memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A memory sub-system can be monitored to identify events associated with the operation of the memory sub-system. The events are tracked and logged in an event log storing information associated with each event (herein "event information"). An event log entry corresponding to an event can include multiple data fields of event data. Example data fields can include an event number, an event identifier, a power cycle count, a timestamp, an event type, a data byte length (Dlen), a temperature of the memory sub-system corresponding to an event, and a firmware version identifier (FWVer). In an embodiment, an event description can be derived from the event identifier, where a mapping (e.g., a table) identifies each event identifier and a corresponding event description. Event logs are subject to a wrapping process, where older log entries are replaced by newer entries in a first-in-first out (FIFO) order in response to exceeding a reserved capacity threshold of a corresponding storage media (e.g., negative-or (NOR) or negative-and (NAND) media). A finite number of event log entries can be stored prior to execution of the wrapping process. In an example, an event log can wrap multiple times, causing the deletion or replacement of multiple log entries.

Conventional management of event logs of a memory sub-system results in the loss of important event information in older log entries due to limitations in storage space availability. Deleted or discarded log entries can include event information that is important to a memory sub-system designer in gaining a better understanding of the memory sub-system's performance history for debugging purposes or design improvements. An example conventional approach to event log management includes the preservation of a first set of event logs when wrapping occurs. In this example, a pointer identifying a storage location within an event log to begin the wrapping process is moved to a later location (e.g., after a first set of event log entries) such that the first set of event log entries are not removed and remain in the wrapped log. This approach can be implemented to preserve the first set of event log entries based on an assumption that the earliest event log entries associated with a memory sub-system are of particular importance. However, multiple other event log entries that are not part of the first set of event log entries are discarded as part of the wrapping process applied to the storage location, resulting in a significant loss of event information.

Another conventional event log management approach is to store certain event log entries (e.g., a first set of log entries identified as including important event information) to a first storage location that is not subject to the wrapping process (e.g., a non-wrapped event log). According to this approach, upon reaching a capacity of the first storage location, subsequent event log entries are stored in a separate storage location (e.g., a second storage location) that is subject to a wrapping process (e.g., a wrapped event log). Accordingly, a vast amount of event information is discarded from the second storage location as a resulting of the wrapping process.

Aspects of the present disclosure address the above and other deficiencies by identifying patterns in event log entries of an event log stored in a storage location subject to a wrapping process (also referred to as a "first event log"). In an embodiment, the identification of a pattern enables multiple log entries to be summarized and preserved from the wrapping process. The preservation of the log entries corresponding to an identified pattern enables the retention of an increased amount of event information that can be useful in understanding a memory sub-system's history. In an embodiment, useful event information can be logged throughout a lifetime of a memory sub-system by creating a summarized log entry including summarizing data of multiple event log entries corresponding to an event log pattern. In an embodiment, the summarized log entries can be stored in a storage location that is not subject to the wrapping process. In an embodiment, the multiple log entries represented by the summarized log entry can be discarded or deleted from the storage location subject to the wrapping process.

In an embodiment, multiple log entry patterns can be identified, including a group-entry pattern and a single-entry pattern. A group-entry pattern can represent multiple consecutive log entries representing a set of events that occur as a group. For example, group-entry patterns can occur as a function of a host workload or activity (e.g., datacenter environment activity) or due to a sequence of events that are executed in a pattern when the memory sub-system executes a certain task (e.g., a power backup routine). Example group-entry patterns are illustrated in FIG. 5A.

Figures 6A, 6B:
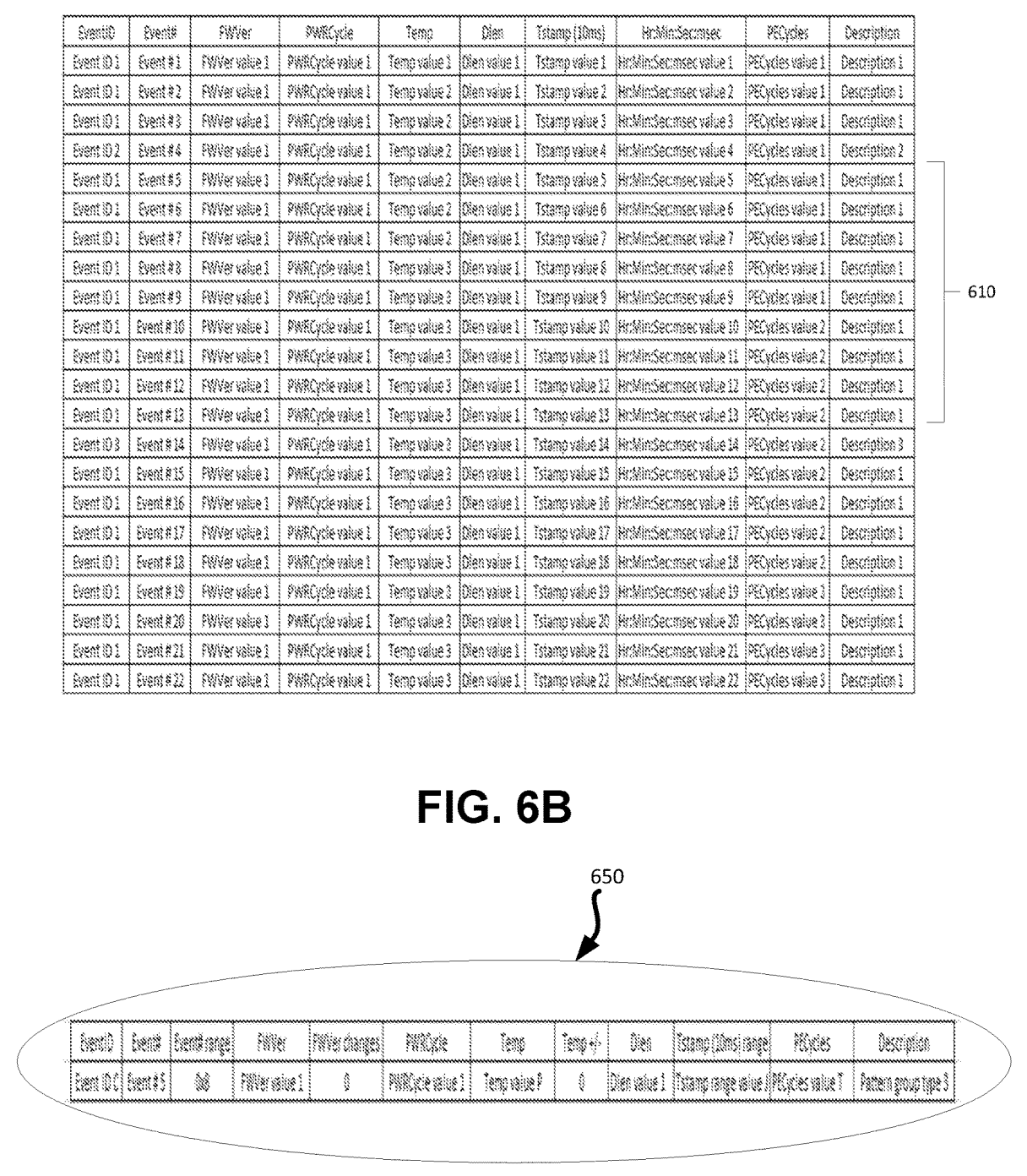

A single-entry pattern can represent a single log entry that is repeated multiple times consecutively. For example, a single-entry pattern can be produced when the memory sub-system undergoes internal error handling routines (e.g., NAND read error handle logs). An example of a single-entry pattern is illustrated in FIG. 6A.

In an embodiment, a log entry definition is generated to represent the identified pattern of log entries. In an embodiment, summarized data corresponding to the data of the set of log entries in the pattern is generated. The log entry definition is populated with the summarized data to generate a summarized log entry. In an embodiment, the summarized log entry is stored in an event log that is not subject to the wrapping process (also referred to as a "second event log"). In an embodiment, having stored the summarized log entry representative of the pattern of log entries identified in a storage location not subject to the wrapping process (i.e., the second event log), the set of log entries in the pattern is deleted from the storage location subject to a wrapping process (i.e., the first event log). Advantageously, additional event information is preserved by storing the summarized log entry in the second event log since it is not wrapped. For example, preservation of event information that would be deleted as part of a wrapping process enables improved analysis of the memory sub-system's performance based on a greater body of information, improved debugging operations, and the use of the preserved event information to identify design changes. In addition, deletion of the set of log entries from the wrapped event log (i.e., the first event log) creates additional storage space for further event log entries.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a NAND type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), NOR flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes an event log management component 113 that can be used to manage event logs associated with the memory components 112A to 112N. In some embodiments, the controller 115 includes at least a portion of the event log management component 113. For example, the controller 115 can include a processor 117 (processing device) configured to execute instructions stored in local memory 119 for performing the operations described herein. In some embodiments, the event log management component 113 is part of the host system 120, an application, or an operating system.

The event log management component 113 can scan and analyze an event log associated with a memory sub-system. The event log can be stored in a storage location subject to a wrapping process. In an embodiment, the event log management component 113 identifies a set of log entries in the event log representing a pattern of event log entries. In an embodiment, the event log management component 113 generates a log entry definition corresponding to the identified pattern of log entries. The log entry definition can include multiple data fields representative of the pattern where the data fields are to be populated with summarized data corresponding to the set of log entries in the pattern.

In an embodiment, the event log management component 113 determines a type of data in each field of the set of log entries in the pattern. In an embodiment, the event log management component 113 identifies the data in each of the data fields as one of the following data types: a linear varying data type, a non-linear varying data type, and a non-numeric data type. In an embodiment, based on the data type identified for each data field, the event log management component 113 generates summarized data. The event log management component 113 generates a summarized log entry including the log entry definition populated with the summarized data. The summarized log entry is stored in an event log that is not subject to a wrapping process (e.g., a different event log and storage location as compared to the storage location subject to the wrapping process). In an embodiment, the pattern of log entries identified in the storage location subject to the wrapping process is deleted, thereby creating additional storage space for further event log entries.

According to embodiments, the generation of a summarized log entry and storage of the summarized log entry in a non-wrapped storage location enables the preservation of event information representative of the history and operation of the memory sub-system. In an embodiment, preservation of the additional event information and protection against wrapping of the information results in a more robust historical representation of the memory sub-system's performance for use in debugging and identifying design improvements. Further details with regards to the operations of the event log management component 113 are described below.

Figure 2:
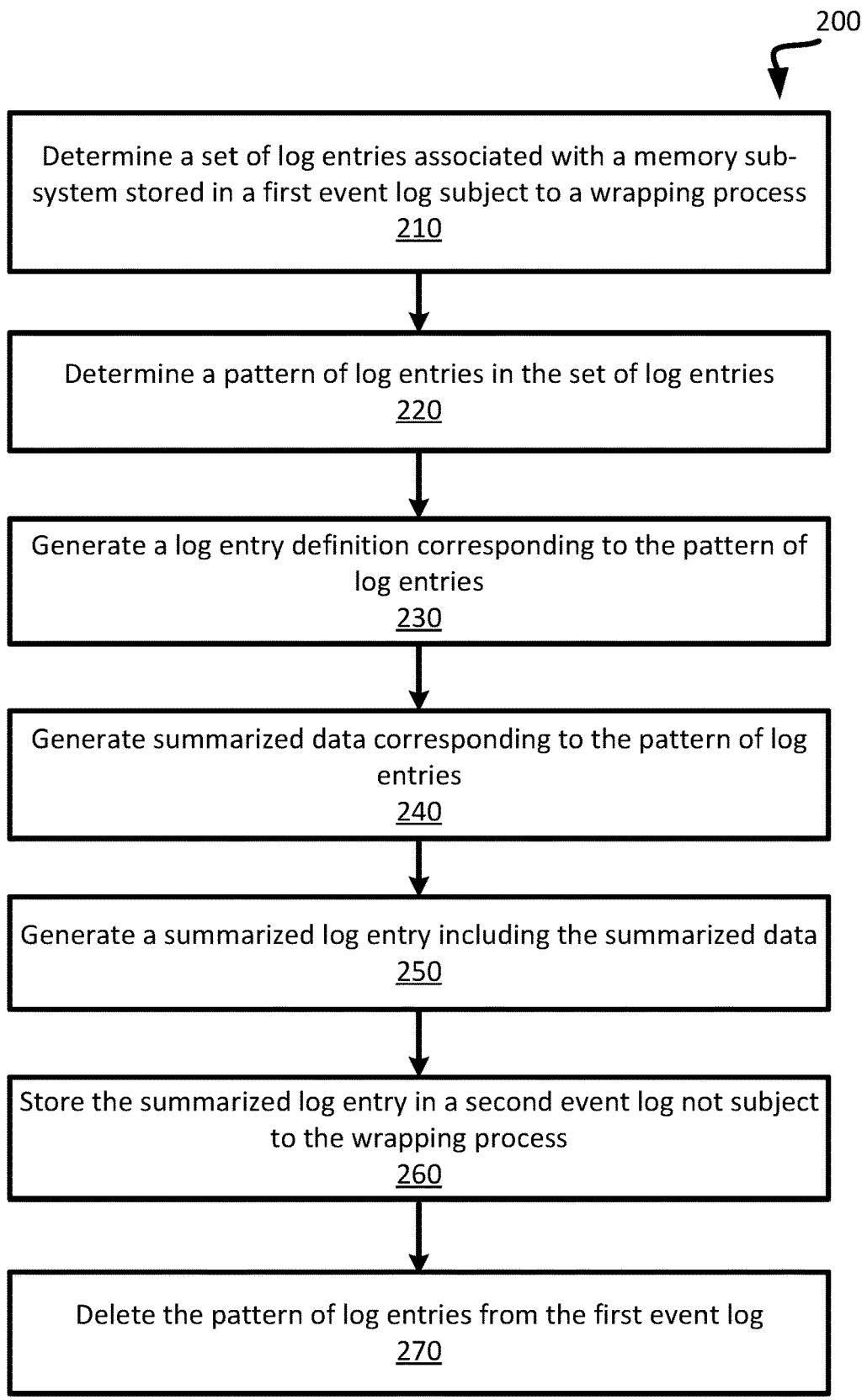
FIG. 2 is a flow diagram of an example method to manage event log entries associated with a memory sub-system in accordance with some embodiments of the present disclosure.

FIG. 2 illustrates an example method 200 to manage log entries of an event log subject to a wrapping process (i.e., a first event log) in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the event log management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown, at operation 210, the processing logic determines a set of log entries associated with a memory sub-system stored in a first event log subject to a wrapping process. In an embodiment, the first event log is configured to store multiple log entries corresponding to respective events associated with the memory sub-system. The first event log is subject to a wrapping process, such that the first event log is iteratively wrapped (e.g., a first-in entry is deleted and replaced with a most recent entry). In an embodiment, the wrapping process can be executed in response to an available storage capacity of the first event log reaching a threshold amount of the total available storage capacity that triggers the wrapping process (i.e., a wrapping threshold). For example, the first event log can be configured to wrap when the wrapping threshold is satisfied (e.g., the wrapping process is executed in response to the available storage space reaching 10% of the total storage capacity).

In an embodiment, each log entry includes multiple data fields including corresponding data. For example, a log entry can include an event number field including a monotonically increasing numerical value, an event identifier field include a numerical description of the event, a power cycle count including a number of times the memory sub-system was power cycled at a time of the log entry, a timestamp field including a time elapsed since the memory sub-system was powered on, an event type field including a category of the event (e.g., a critical event, a generic event, etc.), and a data byte length field including a number of bytes used for the log entry in a corresponding event log storage location.

In an embodiment, method 200 can be executed prior to the execution of a wrapping process on the first event log. In an embodiment, one or more operations of the method 200 can be scheduled to execute in response to reaching a certain threshold of available storage space of the first event log (i.e., an available storage capacity threshold) that is greater than the wrapping threshold. For example, the wrapping process can be scheduled to initiate on the first event log when the available storage space of the first event log reaches 10% (i.e., the wrapping threshold). In this example, the method 200 can be scheduled to be performed when the available storage space of the first event log reaches an available storage capacity threshold of 15%. In an embodiment, the available storage capacity threshold is set to a value greater than the wrapping threshold to avoid execution of the wrapping process on the first event log and corresponding loss of the one or more first-in log entries.

At operation 220, the processing logic determines a pattern of log entries in the set of log entries. In an embodiment, the process logic can maintain a set or library of defined patterns. The log entries in the set of log entries can be scanned, analyzed and compared to the defined patterns to identify a match. In an embodiment, the process logic can create or generate a pattern based on a scan of the set of log entries. In this example, the generated pattern can be added to the library of defined patterns for use in a subsequent scan of an event log. In an embodiment, one or more data fields of the set of log entries can be placed in a buffer during a scan for comparison with subsequent log entries to determine if a repetition in the one or more data fields occurs. For example, an event description data field and corresponding data can be checked and stored in the buffer for each of the set of log entries. The processing logic can review the buffer to determine if a pattern in a series of event description data is present and identifies a pattern of log entries.

At operation 230, the processing logic generates a log entry definition corresponding to the pattern of log entries. In an embodiment, the log entry definition includes multiple data fields corresponding to the log entries associated with the identified pattern. For example, the log entry definition can include all or a portion of the data fields of the respective log entries in the pattern. In an embodiment, the processing logic determines a type of pattern associated with the identified pattern. For example, the identified pattern can be a group-entry pattern including multiple consecutive log entries that occur as a group (e.g., a repeated ordered sequence of events). An example group-entry pattern can include a set of events corresponding to a power backup routine. In another example, the identified pattern can be a single-entry pattern including a single log entry that is repeated continuously (e.g., consecutively) multiple times, wherein each repeated log entry does not add additional useful information. For example, certain data fields can be identified as including "useful" information and the processing logic can identify multiple log entries having the same data in those data fields (e.g., a predetermined data field such as an event description field).

In an embodiment, the log entry definition includes a pattern description field to include a description of the pattern and/or an identification of a pattern type (e.g., group-entry pattern type A, group-entry pattern type B, group-entry pattern type N, single-entry pattern type X, single-entry pattern type Y, etc.). In an embodiment, generation of the log entry definition can include discarding or deleting one or more data fields included in the multiple log entries of the identified pattern. For example, the processing logic can identify one or more data fields of the set of log entries of the pattern relating to non-useful data that can be removed or discarded from the log entry definition representing the identified pattern.

At operation 240, the processing logic generates summarized data corresponding to the pattern of log entries. In an embodiment, the summarized data is a summarized or compressed representation of the data of the pattern of log entries. In an embodiment, the summarized data can be generated based on an identification of a data type associated with the data in the data fields of the pattern of log entries. For example, the pattern of log entries can include five log entries representing a group-entry pattern. Each of the five log entries includes multiple data fields including respective event data. In this example, the summarized data compresses or summarizes the event data of the five log entries, such that the event data of the pattern can be captured and represented in the summarized data hence utilizing significantly less storage capacity.

At operation 250, the processing logic generates a summarized log entry including the summarized data. In an embodiment, the summarized log entry is based on the log entry definition and corresponding data fields. In an embodiment, the data fields of the log entry definition are populated with the summarized data to form the summarized log entry.

At operation 260, the processing logic stores the summarized log entry in a second event log that is not subject to the wrapping process. In an embodiment, the second event log is a separate storage location from the first event log (i.e., the event log subject to the wrapping process).

At operation 270, the processing logic deletes the first pattern of log entries from the first event log. In an embodiment, deletion of the pattern of log entries and corresponding data creates additional storage space in the first event log. In an embodiment, removal of the log entries corresponding to the identified pattern increases the amount of available space relative to the wrapping threshold used to trigger the wrapping process.

Figure 3:
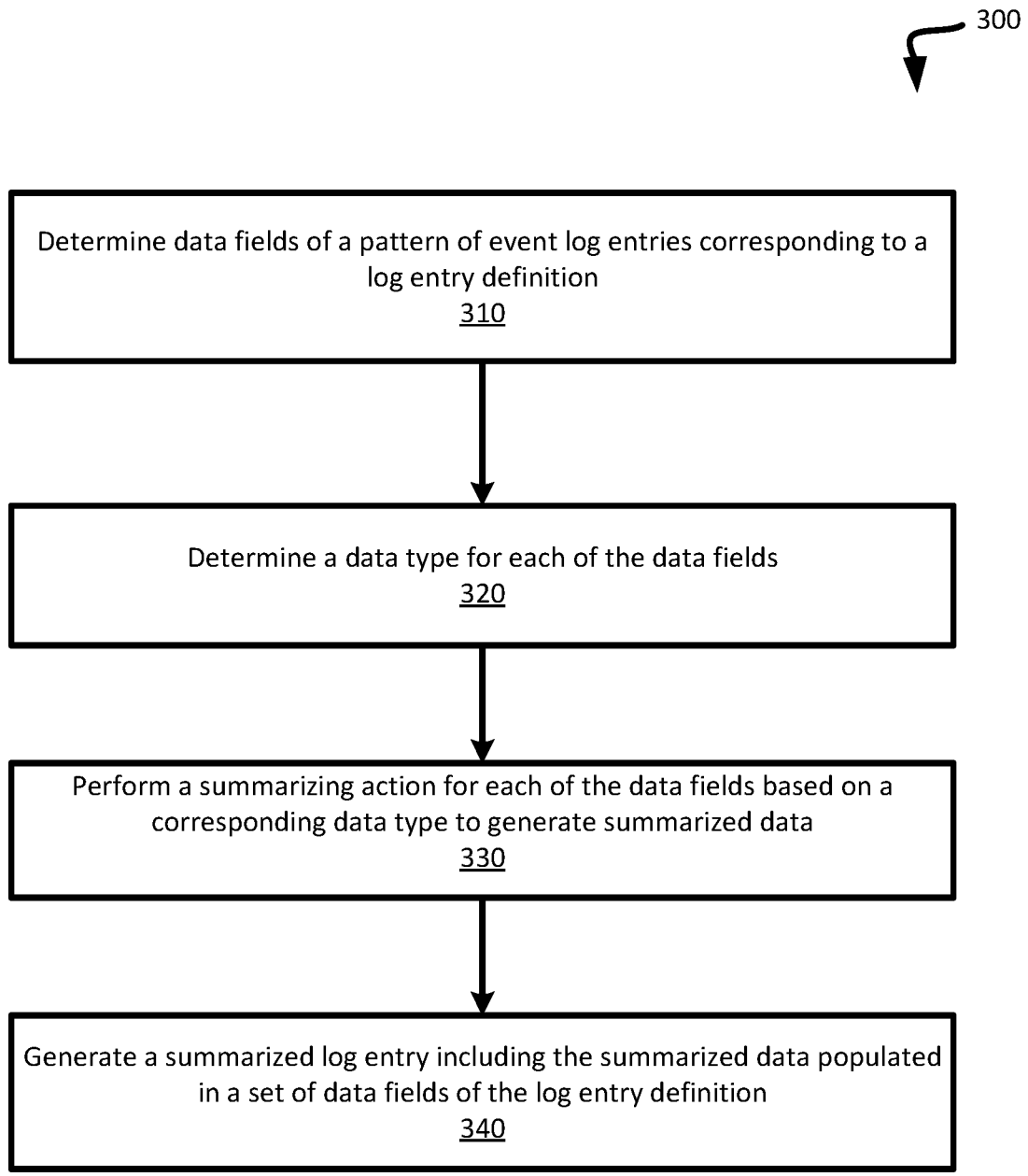
FIG. 3 is a flow diagram of an example method to generate a summarized log entry representing a pattern of event log entries associated with a memory sub-system in accordance with some embodiments of the present disclosure.

FIG. 3 illustrates an example method 300 to generate a summarized log entry corresponding to a pattern of log entries identified in a first event log subject to a wrapping process, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the event log management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic determines data fields of a pattern of event log entries corresponding of a log entry definition. As described above, the pattern of event log entries can be a single-entry pattern or a group-entry pattern corresponding to a log entry definition. In an embodiment, the single-entry pattern includes multiple log entries corresponding to a same or single repeating log entry, where each repeated log entry does not add useful event information relative to the other log entries in the repeated pattern. In an embodiment, the multiple log entries in the single-entry pattern include the same data in one or more of the data fields, such as the event identifier field and the event description field. In an embodiment, the data in certain data fields of the multiple log entries in the single-entry pattern is not the same, such as, for example, an event number, a timestamp, a power cycle count, etc. In an embodiment, the data fields can be identified based on each unique event identifier for each event log entry. In an embodiment, a table or other data structure is maintained by the processing logic (e.g., the processing logic of the event log management component 113 of FIG. 1) that store the multiple data fields for each log entry. In an embodiment, multiple event entries can share one or more data fields. In an embodiment, using the event identifier, the corresponding data fields of the log entry are determined by the processing logic and can be used to summarize the determined data fields to preserve the data included therein, as described in detail below.

At operation 320, the processing logic determines a data type for each of the data fields. In an embodiment, each of the data fields is identified as one of the following data types: a linear varying data type, a non-linear varying data type, or a non-numeric data type. In an embodiment, additional data types can be identified and the data fields can be scanned to determine an associated data type for each of the data fields. In an embodiment, the data type for each event is determined based on the event identifier associated with the event entry. In an embodiment, the data type for each event can be stored in a memory of or accessible by the processing logic (e.g., the event log management component 113 of FIG. 1).

At operation 330, the processing logic performs a summarizing action for each of the data fields based on a corresponding data type to generate summarized data. In an embodiment, a summarizing action includes the manner or method used to summarize the data associated with the corresponding data field and generate summarized data representing the data field for the multiple log entries in the pattern. In an embodiment, for a data field including linear varying data (i.e., a linear varying data type), the summarizing action can include determining a rate of change of a data variable associated with the data field. In an embodiment, the summarizing action includes summarizing the data in the linear varying data fields by a start value, a step, and an end value. For example, an event number data field can include a monotonically increasing numeric value. For a pattern including multiple log entries (e.g., 5 log entries), the summarizing action compresses or summarizes the data in the event number data field of the 5 log entries to produce summarized data (e.g., [event number 0 (start value), 1 (step), event number 4 (end value)]).

In an example, for a data field including non-linear varying data (i.e., a non-linear varying data type), the summarizing action includes performing a statistical analysis of the data to determine a manner in which a variable of the data is changing. In an embodiment, the summarizing action can include identifying one or more of a geometric mean, a harmonic mean, or a standard mean of the data. In an embodiment, the summarizing action can include any suitable statistical analysis technique to evaluate the data of the non-linear varying data field and produce summarized data (e.g., the geometric mean, harmonic mean, or standard mean of the data in the data field of the multiple log entries of the pattern). For example, a temperature data field (i.e., a data field indicating a memory sub-system's temperature at a time of the event log entry) is a non-linear varying data field including data that can vary non-linearly over time (as shown in FIG. 5A).

In an example, for a data field including non-numeric data (i.e., a non-numeric data type), the summarizing action includes listing all unique data values in order of occurrence in the log entries of the pattern. For example, for the firmware version (FWVer) field (as shown in FIG. 5A) which includes non-numeric data values, all of the changes to the data values that occurred during a time associated with the set of log entries of the pattern are identified to generate a firmware change value (e.g., 0, 1, 2, etc.) as the summarized data for the data of the firmware version data field of the multiple log entries of the pattern.

At operation 340, the processing logic generates a summarized log entry including the summarized data populated in a set of data fields of the log entry definition. In an embodiment, the data fields that are summarized as part of the summarized log entry are determined based on the event identifier corresponding to each event entry. In an embodiment, the summarized log entry includes summarized data corresponding to the multiple log entries of the pattern. In an embodiment, the summarized log entry is a single log entry configured to represent multiple log entries, thus consuming a smaller amount of storage space in an event log as compared to the multiple different log entries of the pattern. In an embodiment, the summarized log entry can discard or delete one or more data fields of the multiple log entries of the pattern. In an embodiment, the multiple data fields of the summarized log entry can be determined based on an event identifier corresponding to a pattern of log entries. For example, upon determining a pattern of event entries, an event identifier associated with the pattern can be determined and the event identifier can be used to determine the data fields of the summarized log entry.

In an embodiment, one or more data fields can be identified as non-relevant or redundant (e.g., captured in a portion of the summarized data set forth in another data field). In such a case, the data field can be removed in generating the summarized log entry. For example, the time stamp value field can be deleted as including non-relevant information that is replaced by a timestamp range and corresponding summarized data representing the timestamp range for the set of log entries in the pattern. In an embodiment, the summarized log entry can add one or more data fields as compared to the multiple log entries of the pattern. In an embodiment, a data field can be added to the summarized log entry to include summarized data that is not present in a data field in the pattern of log entries. For example, the individual log entries of the pattern include a temperature value data field, but not a temperature range. The summarized data can include a new data element indicating a temperature range for the multiple log entries in the pattern, and the new data field is added to the summarized log entry to include the new summarized data (e.g., the temperature range data). In an embodiment, the summarized log entry can include a description field that can include a pattern group type identifier and a unique description of the associated pattern of log entries (e.g., pattern group type X/power backup routine; pattern group type Y/NAND read error handle). In an embodiment, as described above with respect to FIG. 2, the summarized log entry can be stored in an event log that is not subject to the wrapping process, thereby preserving event information corresponding to the multiple log entries of the pattern in a summarized format.

Figure 4:
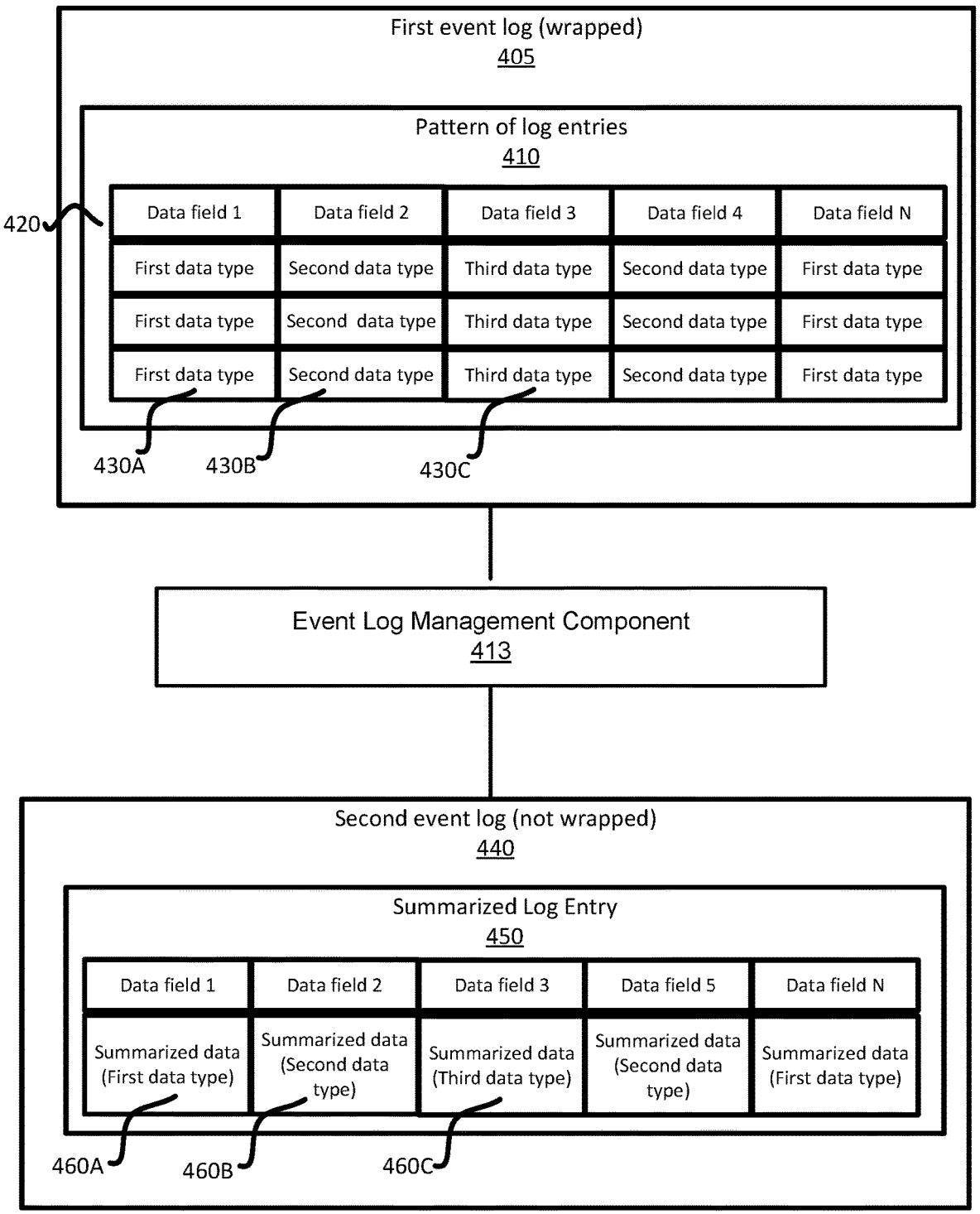
FIG. 4 illustrates an example event log management component managing event log entries and multiple storage locations in accordance with some embodiments of the present disclosure.

FIG. 4 illustrates an example of an event log management component 413 managing log entries of a first event log subject to a wrapping process in accordance with some embodiments of the present disclosure. In an embodiment, the event log management component 413 identifies a pattern of log entries 410 stored in the first event log 405. The event log management component 410 identifies a data type (e.g., a first data type 430A, a second data type 430B, a third data type 430C) for each of the data fields 420 (e.g., Data field 1, Data field 2, Data field 3, Data field 4, and Data field N) of the multiple log entries in the pattern of log entries 410. In an embodiment, the event log management component 413 determines the data type for the data fields based on the event identifier associated with the event entry.

In an embodiment, the event log management component 413 generates a summarized log entry 450 representing the pattern of log entries 410. In an embodiment, the summarized log entry includes data fields (e.g., Data field 1, Data field 2, Data field 3, Data field 5, and Data field N) populated with summarized data 460A, 460B, 460C. In the example shown in FIG. 4, in generating the summarized log entry 450, the event log management component 413 discards a data field of the pattern of log entries (i.e., Data field 4 of the pattern of log entries 410) and adds a new data field (i.e., Data field 5 of the summarized log entry 450). In an embodiment, the summarized data is generated based on a corresponding data type of the respective data field (e.g., the first data type, the second data type, the third data type), as described above in detail with respect to FIGS. 2 and 3.

In an embodiment, the event log management component 413 stores the summarized log entry in a second event log that is not subject to the wrapping process 440. In an embodiment, the event log management component 413 deletes the pattern of log entries 410 from the first event log 405 to generate additional free storage space in the first event log 405. In an embodiment, the summarized log entry 450 is preserved and increases an amount of useful information relating to a memory sub-system that can be analyzed for debugging purposes or identifying design improvements.

FIG. 5A illustrates an example event log stored in a first storage location subject to a wrapping process in accordance with some embodiments of the present disclosure. In the example, multiple event log entries including multiple data fields are stored in the event log. In an embodiment, a pattern of log entries 510A is identified. In an embodiment, the pattern identification processing can be applied recursively to identify the pattern 510A as a group-entry pattern of a first pattern group type (e.g., Pattern group type 2b) including six log entries that repeat in an ordered sequence multiple times. In an embodiment, pattern 510A can be summarized in a summarized log entry 550A, as shown in FIG. 5B. In an embodiment, the pattern 510A can be identified as part of a larger group-entry pattern 510B of a second pattern group type (e.g., Pattern group type 2c). In an embodiment, the entire pattern of entries 510B can be summarized as a summarized log entry 550B, as shown in FIG. 5C.

In this example, a first instance of the pattern 510A observed by the processing logic includes event numbers ranging from Event #1 to Event #6. In this example, the pattern 510A includes multiple data fields including an event identifier field, an event number field, a firmware version field, a power cycle count field, a temperature field, a data length field, a timestamp identifier field, a timestamp value field, a program/erase (PE) cycle count field, and an event description field.

FIG. 5B illustrates a summarized log entry 550A generated to represent the pattern 510A in accordance with some embodiments of the present disclosure. As shown in FIG. 5B, the summarized log entry 550A includes multiple data fields including summarized data based on the data of the identified pattern 510A. In this example, the summarized log entry 550A includes: an event identifier field including a new event identifier defined for the identified pattern; an event number including a starting event number (e.g., Event #1); an event number range including a value to summarize the range of event numbers in the pattern (e.g., Event #1-Event #6=0x05); a firmware version field including a firmware value at the last event in the pattern (e.g., FWVer Value 1); a temperature field including a temperature value at the last event in the pattern; a temperature range field including a magnitude of (highest-lowest) temperature in the pattern; a data length field including a highest value in the pattern; a timestamp field including a timestamp value of the last event in the pattern, a timestamp range field including a magnitude of (highest-lowest) timestamp in the pattern (i.e., an amount of time elapsed); a PE cycles field including a highest PE cycles value in the pattern (i.e., a PE cycle value of the last entry in the pattern since the value is a monotonically increasing value).

As shown in FIG. 5B, certain data fields (e.g., the event number range field, the FWVer Changes field, the temperature range field, and the timestamp range field) not present in the identified pattern of log entries 510A can be added to the summarized log entry 550A along with corresponding data. In an embodiment, one or more data fields from the identified pattern of log entries (e.g., 510A in FIG. 5A) can be removed or discarded from the summarized log entry (e.g., the timestamp field). As shown in the example in FIG. 5B, the summarized log entry 550A includes summarized data in the data fields corresponding to a log entry definition for the identified pattern 510A, including an indication in the Description field of the group-entry pattern type for pattern 510A (e.g., Pattern group type 2b).

FIG. 5C illustrates the summarized log entry 550B generated by the event log management component, in accordance with some embodiments of the present disclosure. As shown in FIG. 5C, certain data fields (e.g., the event number range field, the FWVer Changes field, the temperature range field, and the timestamp range field) not present in the identified pattern of log entries 510B can be added to the summarized log entry 550A along with corresponding data. In an embodiment, one or more data fields from the identified pattern of log entries (e.g., 510B in FIG. 5A) can be removed or discarded from the summarized log entry (e.g., the timestamp field). As shown in the example in FIG. 5C, the summarized log entry 550B includes summarized data in the data fields corresponding to a log entry definition for the identified pattern 510B, including an indication in the Description field of the group-entry pattern type for pattern 510B (e.g., Pattern group type 2c).

In an embodiment, log entry definitions can be stored and matched to the pattern of log entries 510A, 510B to generate the respective summarized log entries 550A and 550B. In another embodiment, a log entry definition can be generated (e.g., if an existing log entry definition does not match an identified pattern) based on the pattern type and data field types, as described in detail above with respect to FIGS. 2 and 3. As shown in FIG. 5B, the summarized log entry 550A includes a description data field including data describing the identified pattern (e.g., pattern group type/pattern description). In an embodiment, identified pattern descriptions, generated log entry definitions can be added to a library as part of a firmware update of a memory sub-system.

FIG. 6A illustrates an example event log stored in a first storage location subject to a wrapping process in accordance with some embodiments of the present disclosure. The event log can include an example single-entry pattern 610. In this example, the single-entry pattern represents multiple consecutive event log entries that include at least a portion of repeated data (e.g., the data in the event identifier (which is associated with an event description), power cycle, temperature, data length, and PE cycles). FIG. 6B illustrates an example summarized log entry 650 generated to represent the single-entry pattern of FIG. 6A. As shown in FIG. 6B, the description field includes data describing the pattern type associated with the identified pattern 610 (e.g., pattern type 3). As described above, the summarized log entry 650 can discard one or more data fields of the log entries of the identified pattern (e.g., the timestamp value field, the temperature field, etc.) and can add one or more fields that are not present in the log entries of the identified pattern (e.g., the FWVer changes field, the temperature range field, the timestamp range field, etc.)

Figure 7:
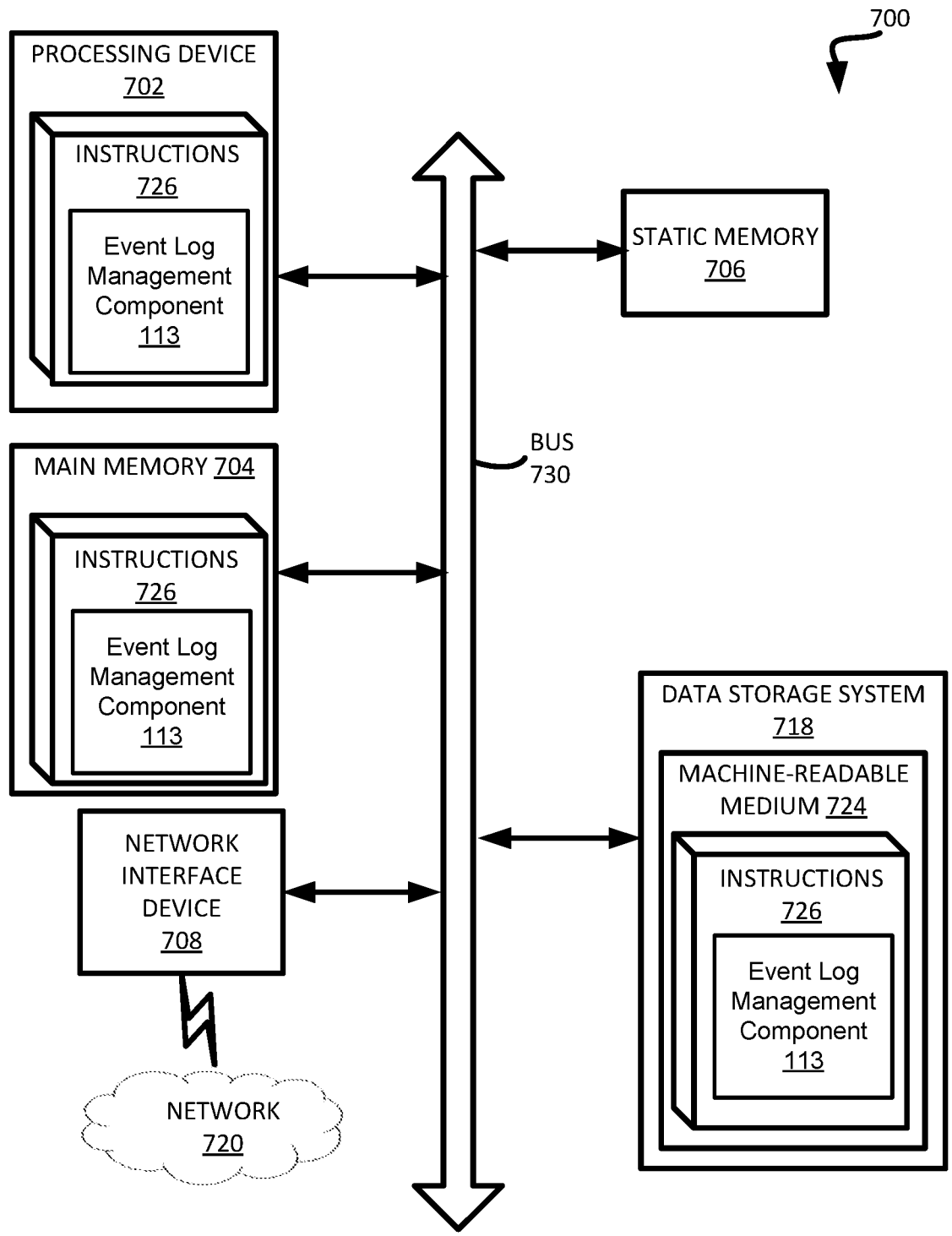
FIG. 7 is a block diagram of an example computer system in which implementations of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the event log management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to an event log management component (e.g., the event log management component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   causing, by a processing device, a set of log entries associated with a memory sub-system to be stored in a first log subject to a wrapping process;
   generating a summarized log entry representing data of a portion of the set of log entries matching a pattern;
   causing the summarized log entry representing the pattern of the portion of the set of log entries to be stored in a second log not subject to the wrapping process, wherein the summarized log entry is preserved from deletion via the wrapping process of the first log;
   executing the wrapping process of the first log in response to determining that an amount of available storage capacity of the first log satisfies an available storage capacity threshold; and
   deleting the set of log entries from the first log by executing the wrapping process.

2. The method of claim 1, further comprising determining a data type of a data field of a log entry of the set of log entries matching the pattern based on an event identifier associated with the log entry.

3. The method of claim 2, further comprising performing a summarizing action for the data field based on the data type to generate the summarized log entry.

4. The method of claim 1, further comprising performing pattern identification processing of the first log to identify the pattern corresponding to the portion of the set of log entries.

5. The method of claim 1, further comprising generating a log entry definition comprising a plurality of data fields corresponding to the pattern of the portion of the set of log entries.

6. The method of claim 5, further comprising adding a data field to the log entry definition to comprise first summarized data.

7. The method of claim 5, further comprising:
   determining a data field of the pattern of log entries to discard in generating the log entry definition.

8. The method of claim 1, further comprising:
   establishing the available storage capacity threshold based on a wrapping threshold associated with the first log.

9. A system comprising:
   a memory component; and
   a processing device, operatively coupled with the memory component, to:
      identify a plurality of data fields of a pattern of log entries corresponding to a log entry definition, wherein the log entries are stored in a first log subject to a wrapping process;
      determine a data type for each of the plurality of data fields;
      perform a summarizing action for each of the data fields based on a corresponding data type to generate summarized data;
      generate a summarized log entry comprising the summarized data populated in a set of data fields of the log entry definition;

cause the summarized log entry to be stored in a second log not subject to the wrapping process, wherein the summarized log entry is preserved from deletion when the wrapping process is executed on the first log; and execute the wrapping process of the first log in response to determining that an amount of available storage capacity of the first log satisfies an available storage capacity threshold.

10. The system of claim 9, wherein to generate the summarizing action, the processing device is further to determine a rate of change of data corresponding to a linear-varying data type.

11. The system of claim 9, wherein to generate the summarizing action, the processing device is further to determine one or more of a geometric mean, a harmonic mean, or a standard mean of data corresponding to a non-linear varying data type.

12. The system of claim 9, wherein to generate the summarizing action, the processing device is further to list one or more data values in order of occurrence for a non-numeric data type.

13. The system of claim 12, the processing device further to:

delete the pattern of log entries from the first log in response to execution of the wrapping process.

14. The system of claim 9, the processing device further to:

scan a plurality of log entries of the first log to identify the pattern of log entries.

15. A non-transitory computer-readable medium comprising instructions, which when executed by a processing device, cause the processing device to perform operations comprising:

causing a set of log entries associated with a memory sub-system to be stored in a first log subject to a wrapping process;

generating a summarized log entry representing data of a portion of the set of log entries matching a pattern;

causing the summarized log entry representing the pattern of the portion of the set of log entries to be stored in a second log not subject to the wrapping process, wherein the summarized log entry is preserved from deletion via the wrapping process of the first log; and executing the wrapping process of the first log in response to determining that an amount of available storage capacity of the first log satisfies an available storage capacity threshold; and deleting the set of log entries from the first log by executing the wrapping process.

16. The non-transitory computer-readable medium of claim 15, the operations further comprising:

determining a data type of a data field of a log entry of the set of log entries matching the pattern based on an event identifier associated with the log entry.

17. The non-transitory computer-readable medium of claim 16, the operations further comprising: performing a summarizing action for the data field based on the data type to generate the summarized log entry.

18. The non-transitory computer-readable medium of claim 15, the operations further comprising performing pattern identification processing of the first log to identify the pattern corresponding to the portion of the set of log entries.

19. The non-transitory computer-readable medium of claim 15, the operations further comprising:

generating a log entry definition comprising a plurality of data fields corresponding to the pattern of the portion of the set of log entries.

* * * * *